UNITED STATES PATENT OFFICE.

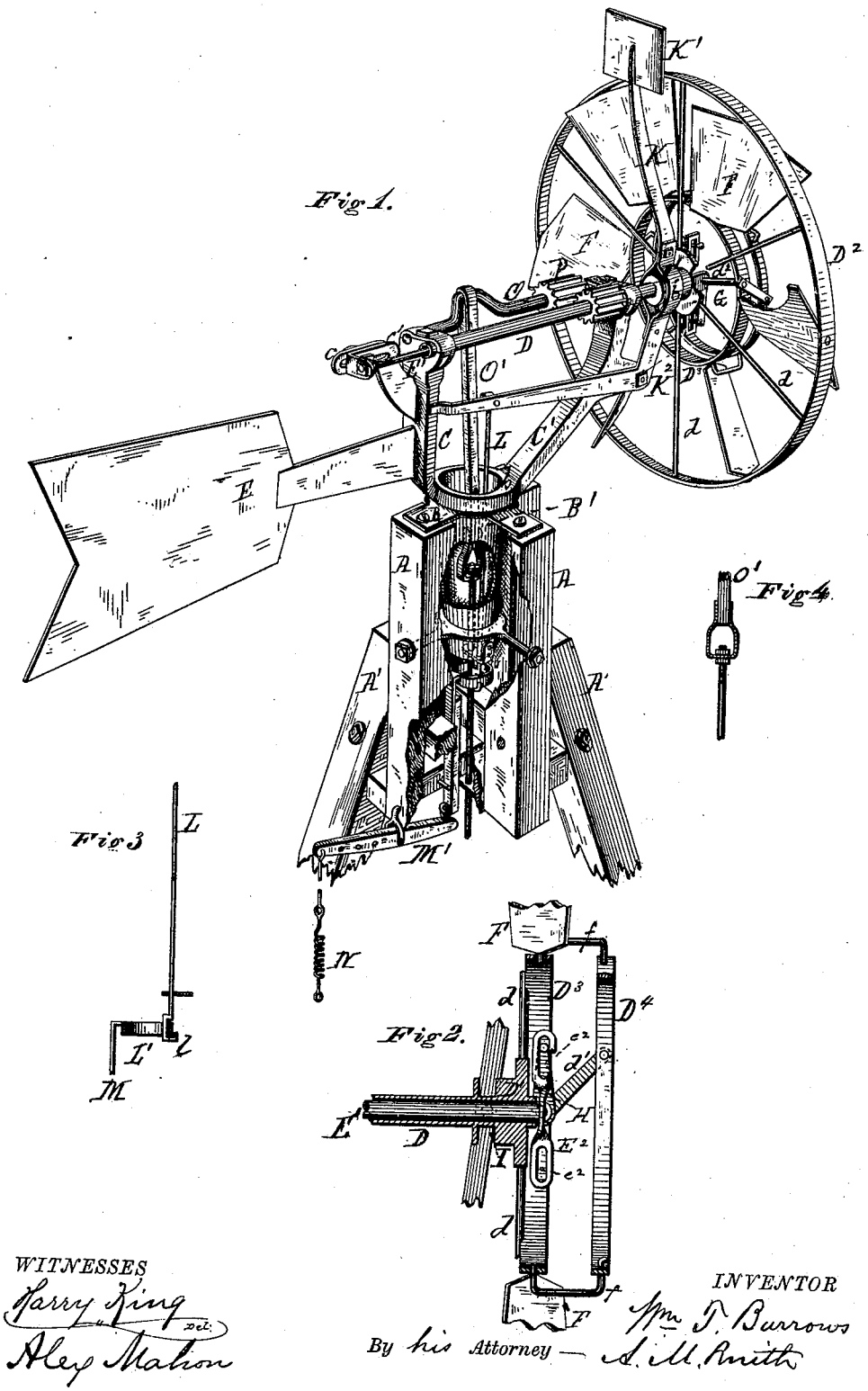

WILLIAM T. BURROWS, OF NASHUA, IOWA, ASSIGNOR OF ONE-HALF HIS RIGHT TO N. B. RIDGWAY AND M. ROSENBAUM, OF SAME PLACE.

IMPROVEMENT IN WINDMILLS.

Specification forming part of Letters Patent No. 178,507, dated June 13, 1876; application filed November 18, 1875.

*To all whom it may concern:*

Be it known that I, WILLIAM T. BURROWS, of Nashua, county of Chickasaw and State of Iowa, have invented certain new and useful Improvements in Windmills, of which the following is a full, clear, and exact description, reference being had to the accompanying drawing, making part of this specification, in which—

Figure 1 is a perspective view of a windmill embracing my improvements. Fig. 2 is a sectional view through the sleeve to which the wind-wheel is attached. Fig. 3 is a side view of the link and collar by which the wheel is thrown into or out of action, showing the manner of connecting them; and Fig. 4 is a side view of a part of the pitman-rod.

Similar letters of reference denote corresponding parts in all the figures.

The invention consists in the combination, with the wind-wheel connected with a sliding sleeve which is adapted to move endwise on its shaft, of a governor vane or blade, the arm or lever of which is pivoted to the sleeve of said wheel, and the blade of which is extended above the surface of the wheel, whereby, as the velocity of the wind is increased, it is caused to act upon said governor vane or blade, and, through its arm or lever, to throw said wheel out of action, as hereinafter described.

It further consists in the combination, with the lever of the governing vane or blade, of a spring for holding the blade to the action of the wind, but permitting it to yield as the force of the wind is increased.

It further consists in a novel manner of mounting the shaft upon which the sleeve of the wheel revolves, and by which the fan-blades are operated, whereby the angle of the blades or the extent of their throw can be regulated, for the purpose hereinafter described.

In the accompanying drawing, A A' represent the frame or tower upon which the wheel is mounted, and upon the upper face of the frame-pieces A is secured plate B, the central portion of which is provided with a circular opening, in which a cylinder, B', to which the wheel is connected, fits, a rim or flange, $b$, upon its upper end, resting upon said plate.

The cylinder B' is made tapering in form, and is further supported by means of a spider or a central disk, provided with radial arms, which arms pass through the frame-pieces A', and are provided upon their outer ends with screw-threads for receiving nuts by means of which said disk is secured to the frame-pieces, while at the same time it assists to hold the frame-pieces A' in proper position. To the rim or flange $b$ are connected uprights C C', in the upper ends of which bearings are formed for the sleeve or shaft D of the wind-wheel, and also for the crank-shaft which drives the pitman. To the rear upright C, about midway of its height, is secured the vane or tail E, and it is further provided, near its upper end, with a bracket, $c$, to which is secured an angle-iron, $c'$. The arm by which it is secured to the bracket $c$ is provided with an elongated slot for permitting its adjustment back or forth, for the purpose hereinafter explained. In the other arm of this angle-iron the shaft $E^1$, upon which the sleeve-shaft is mounted, and with which it revolves, has its bearing. This shaft extends outside of said sleeve-shaft, and is provided with a screw-thread upon its end, and upon each side of the bearing nuts $e$ are secured to permit the adjustment of the shaft. The forward end of the sleeve or shaft D has a collar, $D^1$, secured to it, from the outer face of which radial arms $d$ project, and to the ends of said arms a rim, $D^2$, is secured, in which the outer ends of the fan-blades F are pivoted; the inner ends of the fan-blades being pivoted to a second rim, $D^3$, secured to said radial arm near their inner ends. To this second rim $D^3$, and in front of the same, is connected a rim, $D^4$, by means of pivoted links $d^1$, hereinafter described, and to which rim the inner ends of the fan-blades F are also connected by means of rods $f$, rigidly connected to the fan-blades, but having a pivotal connection with the rim $D^4$. To the front face of the collar $D^1$ are secured lugs or ears $d^2$, which form the bearings for the inner ends of rock-shaft G, the outer ends of this shaft having their bearings in the rim $D^3$, and being rigidly connected with the links $d^1$. To the forward end of the shaft $E^1$ is rigidly connected a cross bar or head, $E^2$, slotted at each end, as shown at $e^2$, in which slots crank-arm H, rigidly connected with the rock-shaft G, have their bearings, the crank-arms H and links $d^1$ being secured to said rock-shaft at an angle of about forty-five degrees, more or less, to each other.

The inner end of collar $D^1$ is provided with a peripherical groove, I, in which spurs $i$, upon the inner side of a collar, I', run as the wheel is operated. To the upper end of this collar an arm, K, is secured, which extends up about on a line with the outer edge of the rim $D^2$, and has secured to said outer end a blade or vane, $K^1$, which blade extends above the surface of the wheel. The lower side of this collar has secured to it a bell-crank lever, $K^2$, which is fulcrumed about midway of the length of the upright C'. This lever extends backward, and has connected to its rear end a rod or link, L, which rod extends downward through the cylinder B', and has its lower end connected with a collar, L', by means of a hook or loop, $l$, formed on its lower end, said connection permitting the rod to turn with the wheel, while the collar remains stationary, the collar forming a track, upon which the lower end of the rod may ride. The collar is mounted in bearings in the frame-pieces A, but in such manner as to permit it to slide up or down. To this collar L' is connected a rod, M, to which is secured a lever, M', which is pivoted, about midway of its length, to the frame A, and has connected to it a spiral spring, N, which is, in turn, connected to a cord or wire extending down to within convenient reach of the ground, and is there secured to the frame. The tension of said spring serves to keep the slats or blades in proper position. This spring may be placed nearer to, or farther from, the fulcrum of the lever, for increasing or diminishing the resistance offered to the wind by the governor vane or blade.

When it is desired to stop the wheel entirely, by releasing the spring the governing vane or blade will offer no resistance to the wind, and will cause the mill to be thrown out of action.

The crank-shaft O, which drives the pitman O', is mounted in bearings in the uprights C C', and has mounted upon it a barrel-pinion, P, which engages with, and is driven by, a similar pinion, secured to the sleeve-shaft D, these pinions being of such length as to permit the sleeve to slide back and forth in its bearings without their becoming disengaged.

The operation is as follows: The wheel being set with the slats at the most efficient angle of presentation to the wind by means of the slotted angle-iron c', in which the shaft $E^1$ is mounted, (being held in this position by the tension of the spring N,) as the force of the wind is increased beyond that point for giving the desired velocity to the wheel, it is caused to act upon the blade or governing-wing $K^1$, which, overcoming the tension of the spring N, and, through its lever, acting upon the collar of the sleeve-shaft, draws said shaft, and with it the wheel, backward on the shaft $E^1$, carrying the rock-shaft G with it, and, by means of the cross-head $E^2$, acting on the crank H, and, through them, on the links $d^1$, turning said links outward, causing them to turn the rim $D^4$ and throw it outward, said rim carrying the rods $f$ connected with the blades, and turning said blades into position more or less parallel with the direction of the wind. As the force or power of the wind abates, the governor vane or blade is forced back to its former position by the action of the spring N, the action of the links and levers being reversed, and the blades of the wheel are caused to assume their oblique position to be acted upon by the wind.

Having now described my invention, what I claim as new, and desire to secure by Letters Patent, is—

1. The combination, with the wind-wheel connected with the sliding sleeve, which is adapted to move endwise bodily on its shaft, of the governing vane or blade for controlling the movements of said wheel, substantially as described.

2. The combination, with the sliding sleeve-shaft, having the barrel-pinion mounted thereon, of the crank-shaft which drives the pitman, provided with a similar pinion for operating the pitman, as described.

3. The shaft $E^1$, through which the fan-blades are operated, in combination with the adjusting devices, substantially as described, whereby the angle of the blades, or the extent of their throw, is regulated, as set forth.

WM. T. BURROWS.

Witnesses:
JNO. WATT, Jr.,
F. G. RATHBUN.